United States Patent [19]

Nakayama et al.

[11] 3,907,637

[45] Sept. 23, 1975

[54] PROCESS FOR THE PRODUCTION OF L-LYSINE

[75] Inventors: Kiyoshi Nakayama, Sagamihara; Mamoru Kohata, Kawasaki; Yoshitake Tanaka, Machida; Tadaaki Nomura, Tokyo; Ryoichi Katsumata, Maebashi, all of Japan

[73] Assignee: Kyowa Hakko Kogyo Co., Ltd., Tokyo, Japan

[22] Filed: Apr. 5, 1974

[21] Appl. No.: 458,424

[30] Foreign Application Priority Data

Apr. 10, 1973 Japan.............................. 48-40043

[52] U.S. Cl. .................... 195/29; 195/47; 195/49; 195/112
[51] Int. Cl............................................ C12d 13/06
[58] Field of Search .......... 195/29, 49, 47, 112, 79, 195/28 R, 96

[56] References Cited

UNITED STATES PATENTS

| | | | |
|---|---|---|---|
| 3,663,370 | 5/1972 | Kono et al. | 195/49 |
| 3,707,441 | 12/1972 | Shiio et al. | 195/30 |
| 3,708,395 | 1/1973 | Nakayama et al. | 195/112 |
| 3,764,476 | 10/1973 | Abe et al. | 195/49 |

*Primary Examiner*—Alvin E. Tanenholtz
*Assistant Examiner*—Thomas G. Wiseman
*Attorney, Agent, or Firm*—Fitzpatrick, Cella, Harper & Scinto

[57] ABSTRACT

L-lysine is produced by fermentation of a mutant strain of the genus Protaminobacter, capable of utilizing methanol and having a resistance to S-2-aminoethyl-L-cysteine and L-threonine. The mutant strain is cultured in a medium containing methanol as a main carbon source. L-lysine is accumulated in the culture medium and isolated therefrom.

6 Claims, No Drawings

PROCESS FOR THE PRODUCTION OF L-LYSINE

BACKGROUND OF THE INVENTION

The present invention relates to the production of L-lysine and more specifically to the production of L-lysine by fermentation of a mutant strain which is capable of utilizing methanol and has a resistance to S-2-aminoethyl-L-cysteine and L-threonine, in a medium containing methanol as a source of carbon.

L-lysine is well known as one of the essential amino acids for human and animal nutrition and is in great demand for food and animal feed supplement.

L-lysine fermentation is well known in the art. There have been proposed a variety of processes for the fermentative production of L-lysine. In such processes, a mutant strains of microorganisms having a requirement for specific amino acids and/or a resistance to L-lysine analogs is cultured in a medium containing carbohydrates, hydrocarbons and organic acids as a source of carbon.

In these years, many attempts have been made on the use of alcohols such as methanol and ethanol for a fermentation raw material. Particularly, much attention has been paid to the use of methanol since methanol is not only available at a low price but also easy to handle in a fermentation procedure.

U.S. Pat. Nos. 3,707,441 and 3,708,395 suggest the use of alcohols for the fermentative production of L-lysine, but neither a practical nor concrete process is disclosed therein.

Reviewing the prior art on the practical production of amino acids from alcohols by fermentation, U.S. Pat. No. 3,595,751 describes preparation of L-lysine from methanol by a strain of the genera Corynebacterium, Brevibacterium, Arthrobacter, Bacillus and Nocardia. U.S. Pat. No. 3,663,370 is directed to the production of L-glutamic acid by certain strains of microorganisms of the genera Methanomonas, Protaminobacter, and Microcyclus.

More specifically, as to the production of L-lysine from methanol, U.K. Pat. No. 1,210,770 teaches culturing of yeasts in a medium containing methanol as a carbon source to obtain microbial cells together with certain amino acids including L-lysine. Further, Japanese Patent Publication No. 25,273/70 discloses production of L-lysine and other amino acids from methanol by strains of the genera Achromobacter and Pseudomonas. However, none of the known processes is satisfactory in the productivity of L-lysine, and therefore, an improvement is still desired.

With an aim to develop an improved process wherein L-lysine is produced in a high yield from methanol, the present inventors have made studies on methanol-utilizing microorganisms which can produce L-lysine. As a result, it has been found that methanol-utilizing mutants of the genus Protaminobacter, which have a resistance to S-2-aminoethyl-L-cysteine and L-threonine, produce a remarkable amount of L-lysine using methanol as a source of carbon.

DESCRIPTION OF THE INVENTION

In accordance with the present invention, it has been found that mutant strains of the genus Protaminobacter, which can utilize methanol and have a resistance to both S-2-aminoethyl-L-cysteine and L-threonine produces L-lysine in a high yield in a medium containing methanol as a main source of carbon.

The mutants contemplated in the present invention are capable of utilizing methanol and have a resistance to S-2-aminoethyl-L-cysteine and L-threonine. It is to be understood that the mutants are capable of growing in the presence of relatively high concentrations of S-2-aminoethyl-L-cysteine and L-threonine while the parent strains are not. A particularly preferred mutant of the invention is *Protaminobacter thiaminophagus* SLR-77 ATCC 21926 which is derived from a methanol-utilizing strain of *Protaminobacter thiaminophagus* ATCC 21371 disclosed in U.S. Pat. No. 3,663,370. The mutant is deposited with American Type Culture Collection, Rockville, MD., U.S.A., and is freely available to the public.

Although the preferred mutant is derived from *Protaminobacter thiaminophagus*, any microorganism of the genus Protaminobacter which is capable of utilizing methanol may be mutated to possess a resistance to S-2-aminoethyl-L-cysteine and L-threonine. Such mutants are also useful in the present invention.

In obtaining mutants suitable for the present invention, any of the conventional methods for inducing mutation to obtain a strain having a resistance may be employed. For example, such artificial mutation means as X-ray irradiation, ultraviolet ray irradiation, nitrogen-mustard treatment, nitrosoguanidine treatment, etc. are appropriate. More specifically, for example, microbial cells of a methanol-utilizing strain of the genus Protaminobacter are suspended in tris-maleate buffer solution having a pH of 6 and containing 100 γ/ml of N-methyl-N'-nitro-N-nitrosoguanidine, at a concentration of $5\times10^8$ cells per 1 ml. The suspension is allowed to stand for an hour. The cells are collected by centrifugation and washed with sterile physiological sodium chloride solution. The cells are suspended in a physiological sodium chloride solution and are then smeared on an agar plate of the following composition and incubated.

| | |
|---|---|
| L-threonine | 20 mg/ml |
| S-2-aminoethyl-L-cysteine | 10 mg/ml |
| sodium citrate | 1.5 mg/ml |
| $(NH_4)_2SO_4$ | 3.0 mg/ml |
| $KH_2PO_4$ | 2.0 mg/ml |
| $K_2HPO_4$ | 7.0 mg/ml |
| $MgSO_4 \cdot 7H_2O$ | 0.5 mg/ml |
| $MnSO_4 \cdot 4H_2O$ | 8 mg/l |
| $FeSO_4 \cdot 7H_2O$ | 10 mg/l |
| thiamine hydrochloride | 1.0 mg/l |
| biotin | 10 γ/l |
| L-methionine | 1.0 mg/ml |
| methanol | 20 ml/l |
| agar | 20 g/l |

The resulting colonies are isolated by any of the well known methods.

In this manner, a strain having a resistance to S-2-aminoethyl-L-cysteine and L-threonine can be obtained. In this case, the resistibility to S-2-aminoethyl-L-cysteine and L-threonine possessed by the mutants to be isolated depends upon the concentration of S-2-aminoethyl-L-cysteine and that of L-threonine present in the medium. In the present invention, usually a mutant strain having a resistance to 10 mg/ml or more of S-2-aminoethyl-L-cysteine and 20 mg/ml or more of L-threonine is suitable.

Any culture medium usually used for the culturing of microorganisms of the genus Protaminobacter is suitable for the present invention as long as it contains methanol as a carbon source, a nitrogen source, inorganic materials and other growth promoting factors which may be required by the specific strain employed.

Methanol to be used as the carbon source sometimes causes the growth inhibition of microogranisms when present at a high concentration in the medium. Generally, it is desirable that the concentration of methanol in the medium be maintained below about 3% (V/V). Good results can be obtained when a medium initially having a low concentration, for example, 0.5–3% (V/V) of methanol is used and culturing is carried out while feeding methanol to the medium continuously in an amount of 0.3–0.6% by volume based on the volume of the medium per hour, or intermittently in an amount of 0.5–2% by volume based on the volume of the medium at each feeding, as methanol is consumed by the microorganism.

As the nitrogen source, ammonium salts such as ammonium chloride, ammonium sulfate, ammonium phosphate and ammonium nitrate, ammonia, and urea may be used. Casamino acid, peptone and yeast extract may also be used as the nitrogen source. These natural organic substances contain vitamins and other growth-promoting substances and, therefore, are effective to reduce culturing time and to promote production of L-lysine, when supplemented in small amounts to the medium as the nitrogen source. Additionally, as inorganic materials, potassium phosphates, magnesium sulfate, iron and manganese salts may be used.

Where the strain employed has a nutritional requirement, an appropriate source of the nutrient must, of course, be supplemented to the medium. *Protaminobacter thiaminophagus*, for example, requires thiamine for growth. Therefore, when the mutant of *Protaminobacter thiaminophagus* is employed, it is necessary to add pure thiamine or a natural substance containing thiamine to the medium.

Culturing is carried out under aerobic conditions at 20° to 40°C for 2 to 5 days. In order to obtain a high yield of the product, it is desirable that the pH of the medium be maintained at 4 to 9, preferably, at around neutral during culturing. The pH may be adjusted with calcium carbonate, various buffer solutions or alkaline solutions.

After the completion of culturing, the microbial cells are removed from the culture liquor by, for example, filtration. The L-lysine thus obtained in the culture liquor is isolated and purified by any of the methods well known in the art, such as an ion exchange resin treatment, crystallization by concentration, etc.

Practice of a specific embodiment of the invention is illustrated by the following representative example.

EXAMPLE 1

In this example, *Protaminobacter thiaminophagus* SLR-77 (FERM-P No. 2020) ATCC 21926 is used. This strain is inoculated in 10 ml of a seed medium having the following composition in a test tube and cultured at 30°C for 20 hours with shaking.

| | |
|---|---|
| methanol | 20 ml |
| $(NH_4)_2SO_4$ | 10 g |
| $KH_2PO_4$ | 2 g |
| $K_2HPO_4$ | 7 g |
| $MgSO_4 \cdot 7H_2O$ | 0.5 g |
| $FeSO_4 \cdot 7H_2O$ | 10 mg |
| $MnSO_4 \cdot 4H_2O$ | 8 mg |
| thiamine hydrochloride | 1 mg |
| biotin | 10 μg |
| yeast extract | 0.1 g |
| $CaCO_3$ | 20 g |
| water to make up the total volume (pH 7.2) | 1 L. |

The resulting seed culture is inoculated into 10 ml portions of a fermentation medium having the same composition as the seed medium in test tubes in a ratio of 1 ml. Fermentation is carried out with shaking at 30°C for 72 hours, while feeding 1% of methanol after 16 hours of culturing and 2% of methanol after 25 and 40 hours of culturing, respectively. After the completion of fermentation, 1.5 mg/ml (as hydrochloride) of L-lysine is produced in the culture liquor.

The culture liquors in the test tubes are combined to make the total volume 2 L. and the microbial cells are removed from the culture liquor. The cell-free culture liquor is subjected to adsorption on a strongly acidic cation exchange resin, Amberlite IR-120 B (product of Rohm & Haas Co., U.S.A.). Elution is carried out with an aqueous ammonia. The eluate is concentrated and neutralized with hydrochloric acid. After crystallization, 2.4 g of crystals of L-lysine hydrochloride is obtained.

What is claimed is:

1. A process for the production of L-lysine which comprises culturing a mutant strain belonging to the genus Protaminobacter, said mutant being capable of utilizing methanol and capable of growing in the presence of at least 10mg/ml of S-2-aminoethyl-L-cystein and at least 20mg/ml of L-threonine, in a nutrient medium containing methanol as a main source of carbon, accumulating L-lysine in said medium and thereafter isolating said L-lysine.

2. A process according to claim 1 wherein said methanol is fed to said culture medium continuously in an amount of 0.3 to 0.6% by volume based upon the volume of the culture medium during said culturing step.

3. A process according to claim 1 wherein said methanol is fed to said culture medium intermittently in an amount of 0.5 to 2% by volume based upon the volume of said culture medium during said culturing step.

4. A process according to claim 1, wherein said mutant belongs to the species *Protaminobacter thiaminophagus*.

5. A process according to claim 4, wherein said mutant is *Protaminobacter thiaminophagus* ATCC 21926.

6. A process according to claim 1, wherein culturing is carried out at 20° to 40°C.

* * * * *